(12) United States Patent
Saund

(10) Patent No.: US 6,377,710 B1
(45) Date of Patent: Apr. 23, 2002

(54) METHOD AND APPARATUS FOR EXTRACTING THE SKELETON OF A BINARY FIGURE BY CONTOUR-BASED EROSION

(75) Inventor: Eric Saund, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/200,187

(22) Filed: Nov. 25, 1998

(51) Int. Cl.⁷ .................................................. G06K 9/42
(52) U.S. Cl. ......................... 382/258; 382/259; 382/242
(58) Field of Search ................................. 382/197, 198, 382/199, 200, 242, 258, 259, 256, 257

(56) References Cited

U.S. PATENT DOCUMENTS

| | | | |
|---|---|---|---|
| 4,093,941 A | * 6/1978 | Bryan et al. ................ | 382/197 |
| 4,520,505 A | * 5/1985 | Yamamoto et al. ......... | 382/258 |
| 4,539,704 A | 9/1985 | Pastor .......................... | 382/55 |
| 4,574,357 A | * 3/1986 | Pastor et al. ................ | 382/258 |
| 4,777,651 A | * 10/1988 | McCann et al. ............ | 382/242 |
| 5,025,314 A | 6/1991 | Tang et al. | |
| 5,072,412 A | 12/1991 | Henderson, Jr. et al. | |
| 5,448,263 A | 9/1995 | Martin | |
| 5,583,949 A | 12/1996 | Smith et al. ................ | 382/199 |
| 5,717,869 A | 2/1998 | Moran et al. | |
| 5,717,879 A | 2/1998 | Moran et al. | |
| 5,754,674 A | 5/1998 | Ott et al. .................... | 382/112 |
| 5,778,092 A | 7/1998 | Macleod et al. ............ | 382/176 |
| 5,786,814 A | 7/1998 | Moran et al. | |
| 5,907,842 A | 5/1999 | Mennemeier ................ | 707/7 |
| 5,940,538 A | * 8/1999 | Spiegel et al. .............. | 382/236 |
| 5,970,170 A | 10/1999 | Kadashevich et al. ...... | 382/187 |
| 5,978,511 A | * 11/1999 | Horiuchi et al. ............ | 382/241 |

OTHER PUBLICATIONS

F. Y. Shih and W–T. Wong, "A New Safe–Point Thinning Algorithm Based on the Mid–Crack Code Tracing", *IEEE Trans. on Systems, Man, and Cybernetics*, vol. 25, No. 2, pp. 370–378 (Feb. 1995).

* cited by examiner

*Primary Examiner*—Bhavesh Mehta
*Assistant Examiner*—Ali Bayat
(74) *Attorney, Agent, or Firm*—Fay, Sharpe, Fagan, Minnich & McKee, LLP

(57) ABSTRACT

A method and apparatus for performing thinning, or skeletonization, of binary images or figures are provided. More particularly, a method is implemented in a system for encoding a figure using a mid-crack boundary representation to identify the boundary contour of the figure. Then, the boundary contour of the figure is traversed while the boundary is selectively displaced inward. The boundary contour is also concurrently re-encoded based on the selectively displaced boundary.

35 Claims, 13 Drawing Sheets

INCOMING
DIRECTION - 0

INCOMING
DIRECTION - 0

INCOMING
DIRECTION - 0

INCOMING
DIRECTION - 1

INCOMING
DIRECTION - 1

INCOMING
DIRECTION - 1

INCOMING
DIRECTION - 1

INCOMING
DIRECTION - 1

INCOMING
DIRECTION - 1

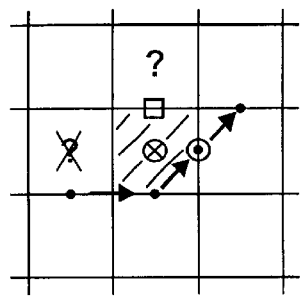
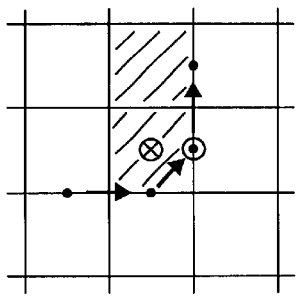
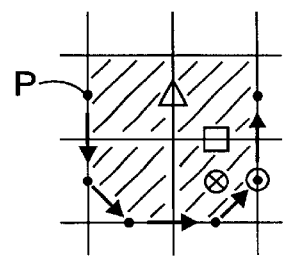
FIG. 7(a)  FIG. 7(b)  FIG. 7(c)
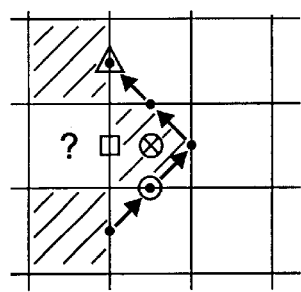
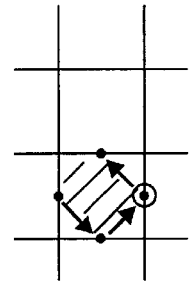
FIG. 7(d)  FIG. 7(e)
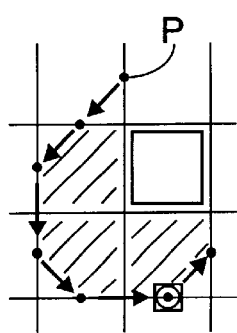
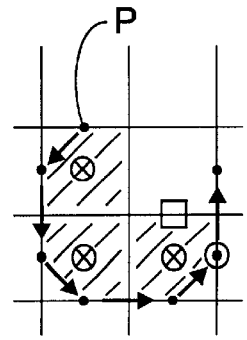
FIG. 7(f)  FIG. 7(g)

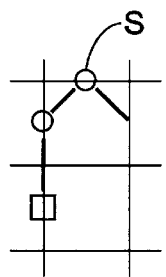
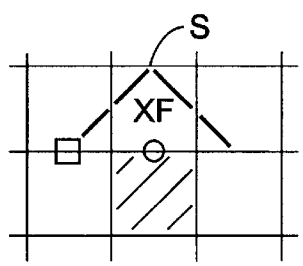
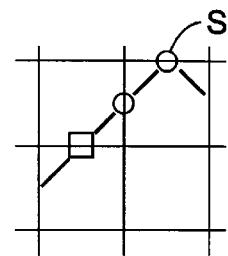
FIG. 8(a)   FIG. 8(b)   FIG. 8(c)
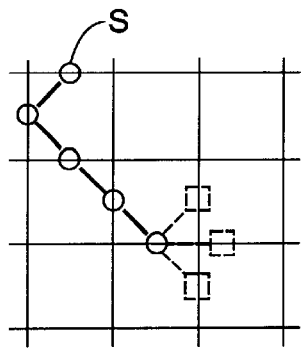
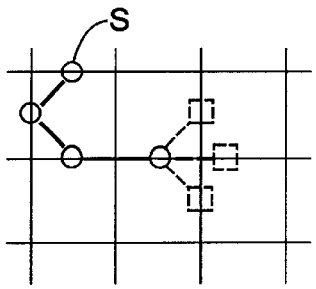
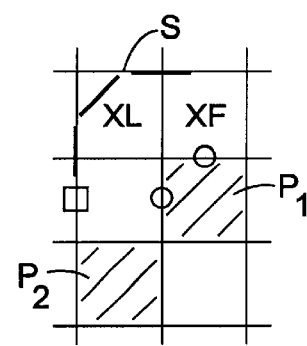
FIG. 8(d)   FIG. 8(e)   FIG. 8(f)

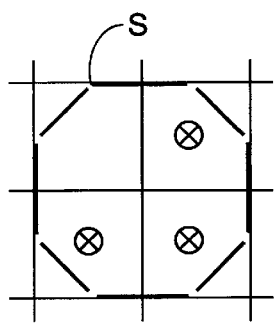
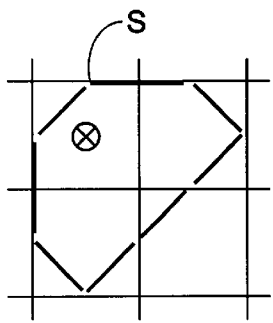
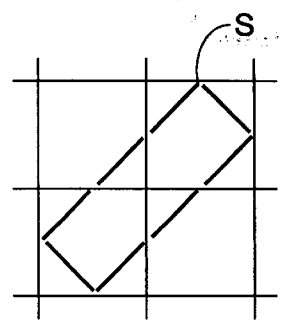
FIG. 11(a)            FIG. 11(b)            FIG. 11(c)
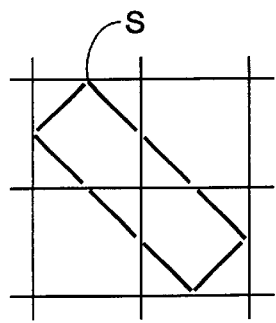
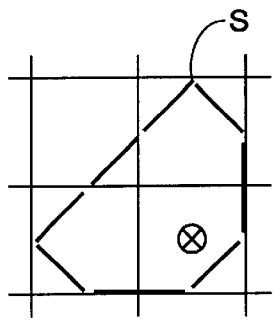
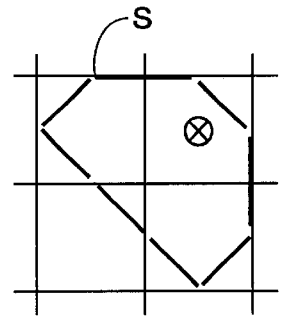
FIG. 11(d)            FIG. 11(e)            FIG. 11(f)
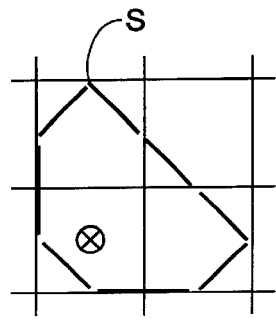
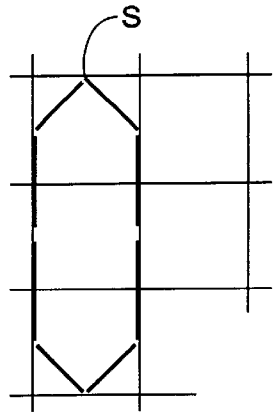
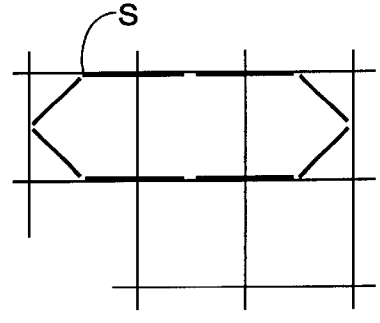
FIG. 11(g)            FIG. 11(h)            FIG. 11(i)

METHOD AND APPARATUS FOR EXTRACTING THE SKELETON OF A BINARY FIGURE BY CONTOUR-BASED EROSION

CROSS-REFERENCE TO RELATED APPLICATION

This application is related to U.S. application Ser. No. 09/199,699, filed on the same date as this application, entitled "Method and Apparatus for Separating Document Image Object Types" by inventor Eric Saund which is incorporated herein by this reference.

BACKGROUND OF THE INVENTION

This invention relates to a method and apparatus for performing thinning, or skeletonization, of binary images or figures. More particularly, the invention is directed to a method implemented in a system for encoding a figure using a mid-crack boundary representation to identify the boundary contour of the figure. Then, the boundary contour of the figure is traversed while the boundary is selectively displaced inward. The boundary contour is also concurrently re-encoded based on the selectively displaced boundary.

While the invention is particularly directed to the art of image processing and skeletonization or thinning, and will thus be described with specific reference thereto, it will be appreciated that the invention may have usefulness in other fields and applications.

By way of background, thinning, or skeletonization, is a prominent step in many line drawing, document, and general image analysis systems. As will be recognized by those of skill in the art, a thinned figure is useful in a variety of different ways, depending on the specific application.

As shown in FIG. 1, the binary image of a pen stroke 10, for example, is typically several pixels in width when extracted by known techniques such as edge detection or thresholding. Oftentimes, however, only the path of the stroke is of interest in analyzing the shape of the stroke. Information on this path of interest is captured by the skeleton 12 of the stroke. The skeleton 12 is typically represented as a chain of pixel locations, which is compatible with a parametric representation such as a spline, leading to shape and semantic level analysis.

Known approaches to skeletonization include distance transform, raster-based erosion—which is performed by repeatedly scanning the image with k×k masks—and contour-based erosion. Under raster-based erosion methods, each raster pass over the image requires examination of the local 8 pixel neighborhood of each pixel to determine whether that pixel lies on the outer extent of the figure. This, of course, is a primary factor in determining whether the pixel can be removed.

Contour-based erosion methods also work by testing the local neighborhoods of pixels to determine whether they can be removed at the current thinning step. However, with a contour-based method, the algorithm proceeds to traverse the boundary contours of figures and test only those pixels that are known to lie on the boundary, i.e., candidates for removal. Because contour-based erosion procedures, in general, examine fewer pixels than exhaustive raster scanning methods, contour-based erosion routines run faster on serial computers, which are not able to examine all pixel neighborhoods in parallel.

Although known contour-based erosion techniques vary, a bounding contour of a figure is most often represented in terms of center locations of pixels lying on the contour boundary. In addition to the boundary description, a bitmap representation of the figure is maintained and updated along with the boundary description. The boundary is traversed, and for each pixel on the boundary, the 8 pixel neighborhood is examined. A rule base or procedure is then consulted to determine whether the center pixel may be deleted and the boundary contour moved. These contour-based erosion techniques, however, do not efficiently thin figures because such techniques require examination of the entire 8 pixel neighborhood of a pixel being considered for erosion.

A thinning algorithm based on safe-point testing and mid-crack code tracing has been proposed in F. Y. Shih and W-T. Wong, "A New Safe-Point Thinning Algorithm Based on the Mid-Crack Code Tracing," *IEEE Trans. on Systems, Man, and Cybernetics,* Vol. 25, No. 2, pp. 370–378 (February 1995) this proposal, thinning is treated as the deletion of "nonsafe" border pixels from the contour to the center of the object layer-by-layer and deletion is determined by masking a 3×3 weighted template and by the use of look-up tables. A major disadvantage to the system is that use of the 3×3 template requires analysis of the 8 pixel neighborhood surrounding the pixel of interest, such analysis contributing to the overall inefficiency of the Shih and Wong algorithm The present invention provides a new and improved image processing method and apparatus for thinning binary figures based on a contour-based erosion which overcomes the above noted problems and difficulties and others. The present invention is thus an improvement over known methods.

SUMMARY OF THE INVENTION

A method and system are provided for thinning a binary figure within an image that has white and black pixels with boundaries therebetween and midpoints on such boundaries for each pixel.

In one aspect of the invention, the method and system provide for scanning the image, encoding the boundary contour of the figure, storing the encoded representation, and selectively converting black pixels to white pixels based on the encoded representation and a set of predetermined rules.

In another aspect of the invention, the scanning comprises locating a starting point on the figure, the starting point being defined as a midpoint on a horizontal boundary above a first boundary between black and white pixels encountered during the scanning.

In another aspect of the invention, the encoding includes tracing from midpoint to midpoint along the contour of the figure to generate a mid-crack chain code for the figure, the tracing commencing at the starting point and proceeding in selected directions having predetermined codes.

In another aspect of the invention, the converting includes selectively converting black pixels to white pixels along the contour of the figure to generate a target contour based on a chain code and a predetermined set of rules stored in a lookup table, wherein the rules require an examination ot fewer than 8 pixels surrounding a black pixel being considered for conversion and are based on a condition that the target contour be a boundary between a white pixel and a black pixel.

In another aspect of the invention, a plurality of figures in an image are successively and incrementally thinned.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of they various parts of the device and steps of the method, whereby the objects contemplated are obtained as hereinafter more fully set forth, specifically pointed out in the claims, and illustrated in the accompanying drawings in which:

FIG. 7(a)–7(g) illustrate exceptions to the path displacement rules;

FIGS. 11(a)–11(i) illustrate a catalog of nine configurations of boundary contours equal to 8 mid-crack steps in length.

DETAILED DESCRIPTION OF THE PREFERRED EMBODIMENT

Figure 1:
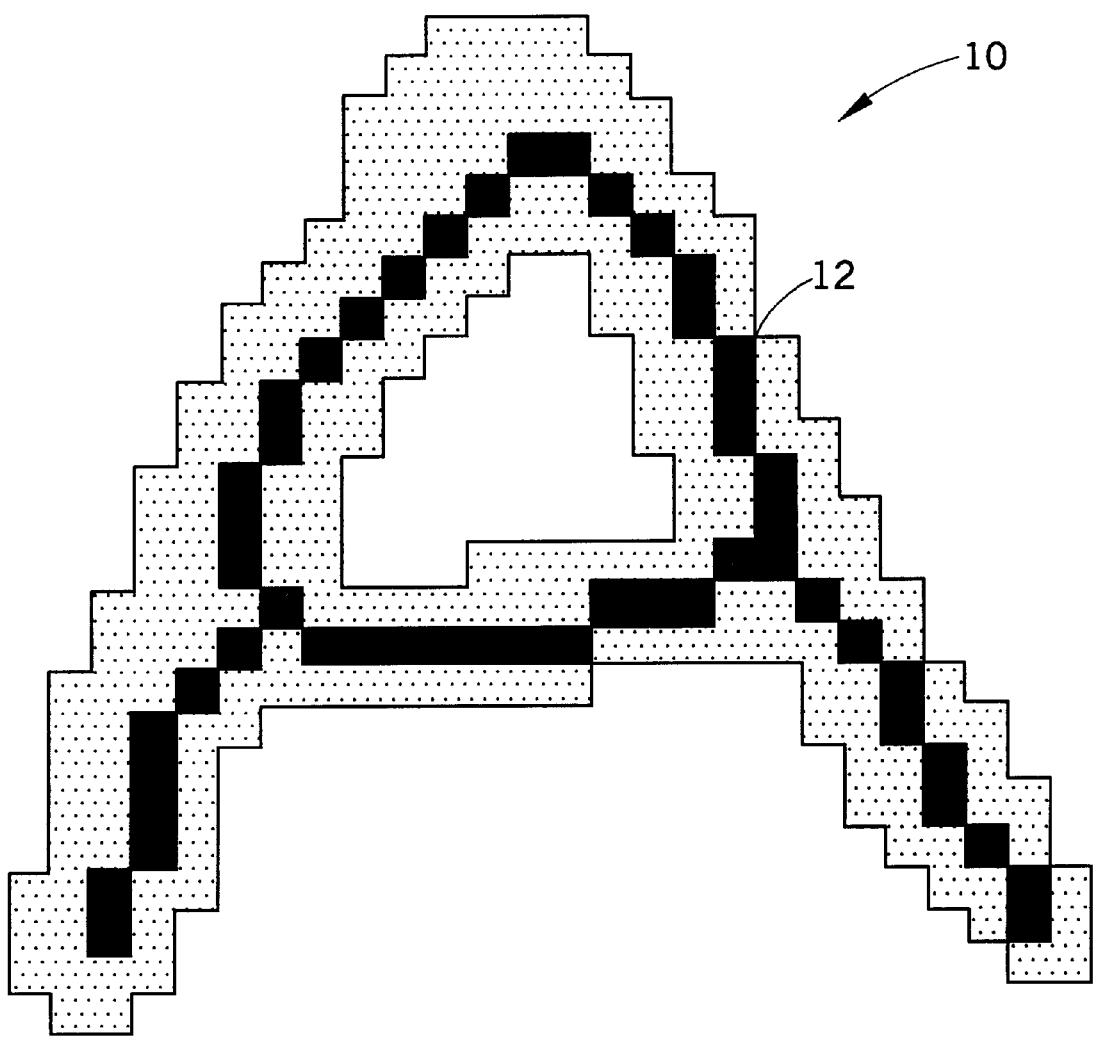
FIG. 1 is an illustration of a skeleton of a binary figure.
Figure 2:
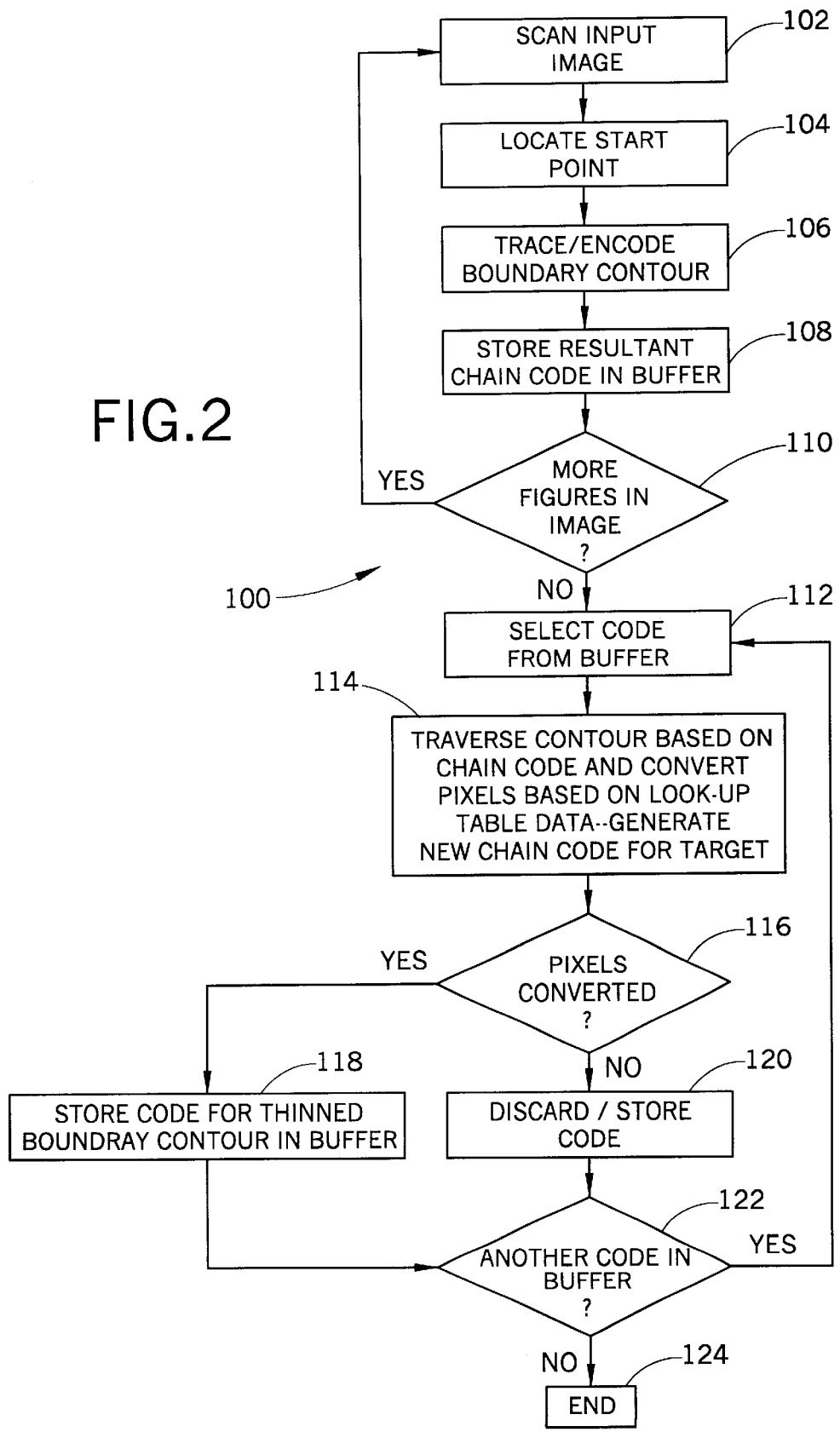
FIG. 2 is a flow chart showing the method of the present invention.

Referring now to the drawings wherein the showings are for purposes of illustrating the preferred embodiments of the invention only and not for purposes of limiting same, the overall preferred method is illustrated in FIG. 2. As shown, the overall thinning method 100 first preferably initiates a raster scanning process on a bitmap of an input image (Step 102). It should be appreciated that an image having white and black pixels may be in the form of a bitmap from its inception or an image may be converted to a bitmap if it were, for example, a hard copy that is scanned into the system. Those with skill in the art will recognize that reference to an "image" may actually be a reference to a corresponding bitmap.

During the raster scanning process, the starting point of a figure (e.g. hole and non-hole boundary contours) in the image is located (Step 104). The boundary contour of the figure is then traced and encoded, resulting in a mid-crack chain code representation (Step 106). As those of skill in the art will appreciate, the determination of whether a boundary contour corresponds to a hole or a non-hole may be based on any known technique including implementation of a finite state machine. It is to be further appreciated that non-holes are first traced and then the holes within the non-holes are located and traced. Also, whether the image is a dark-on-light image or a light-on-dark image is simply a matter of choice. This description of the present invention adapts the convention of dark-on-light images; however, those of skill in the art will recognize that the invention may be suitably implemented in connection with light-on-dark images.

Figure 3A:
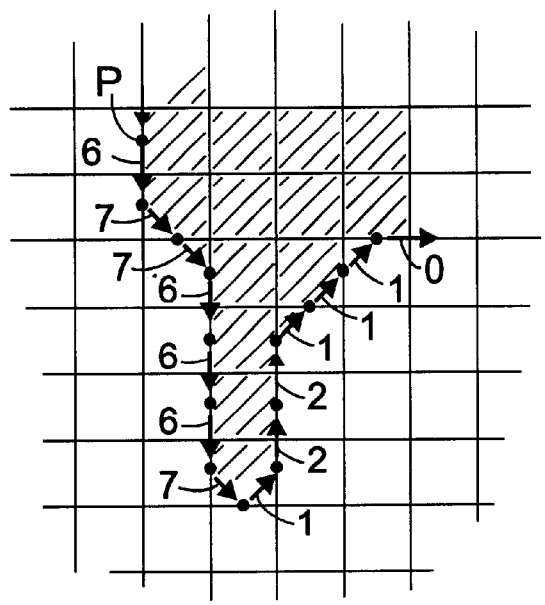
FIGS. 3(a)–3(c) illustrate a mid-crack representation of a figure boundary contour as well as a starting location for coding and path directions.
Figure 3C:
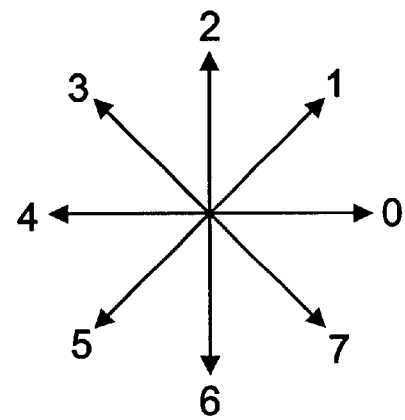
Figure 3B:
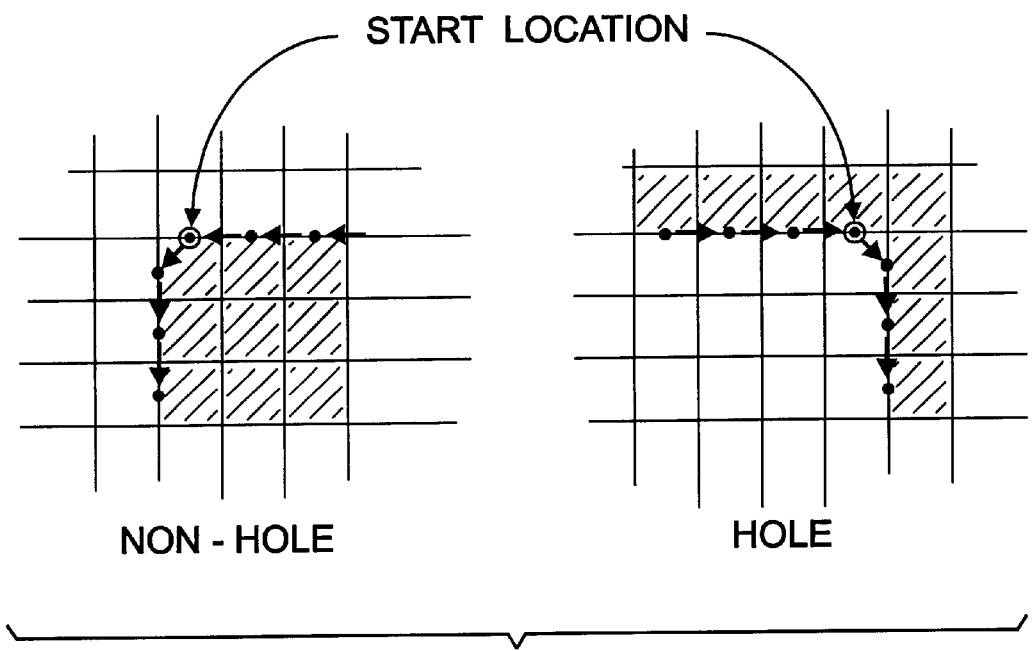

The mid-crack representation is in the form of a code that notes explicitly the midpoints of boundaries between white and black pixels. More specifically, with reference to FIGS. 3(a)–(c), in mid-crack encoding, every connected component in the image is represented by a mid-crack chain code that identifies a starting point and the succession of 8-way direction changes necessary to traverse its boundary. A boundary contour's starting point is defined as being on the horizontal boundary above the first white/black pixel boundary encountered when scanning the bitmap in raster fashion beginning from the upper left corner, as shown in FIG. 3(b) for non-holes and holes. The subsequent chain code tells how to proceed along the contour in steps whose directions are encoded according to the representation of FIG. 3(c). As an example, the chain code for the contour portion illustrated in FIG. 3(a) is { . . . 6, 7, 7, 6, 6, 6, 7, 1, 2, 2, 1, 1, 1, 0 . . . } beginning at point P. One advantage of a mid-crack contour representation is that, as shown, it encodes the traversal of one pixel wide figures without having to retrace pixels.

Referring back to FIG. 2, the mid-crack chain code representation for the figure is stored in a first-in first-out (FIFO) buffer (Step 108). It is then determined whether other figures (non-holes and holes) are present in the image (Step 110). If other figures are present, then steps 102, 104, 106, 108, and 110 are repeated. If no other figures are present, a first mid-crack chain code is selected from the first-in first-out buffer (Step 112). The contour of the figure is traversed according to the chain code and pixels on the boundary contour are selectively converted to obtain a target boundary contour, or thinned boundary contour, based on rules stored in a suitable lookup table(s) (Step 114). The contents of lookup table(s) are more particularly described below; however, the rules require an examination of fewer than the 8 pixels surrounding the pixel being considered for conversion (8 pixel neighborhood) and are based on the condition that the target contour be a boundary between a white pixel and a black pixel. A new chain code for the target contour is also concurrently generated at this step if necessary.

After the figure is traversed, a determination is made as to whether any pixels were converted (Step 116). If traversal of the contour resulted in at least one pixel being converted, and thus a new chain code representation being generated, the new chain code representation is stored in the FIFO buffer (Step 118). If the traversal of the contour in Step 114 results in no pixels being converted, this is an indication that the figure is sufficiently thinned to a skeleton representation and the existing chain code for that figure is either discarded or stored for further processing (Step 120). A determination is then made whether any other chain codes are stored in the first-in first-out buffer (Step 122). If so, steps 112, 114, 116, 118, 120, and 122 are repeated. If no other codes are stored in the buffer, the method is terminated (Step 124).

Figure 4:
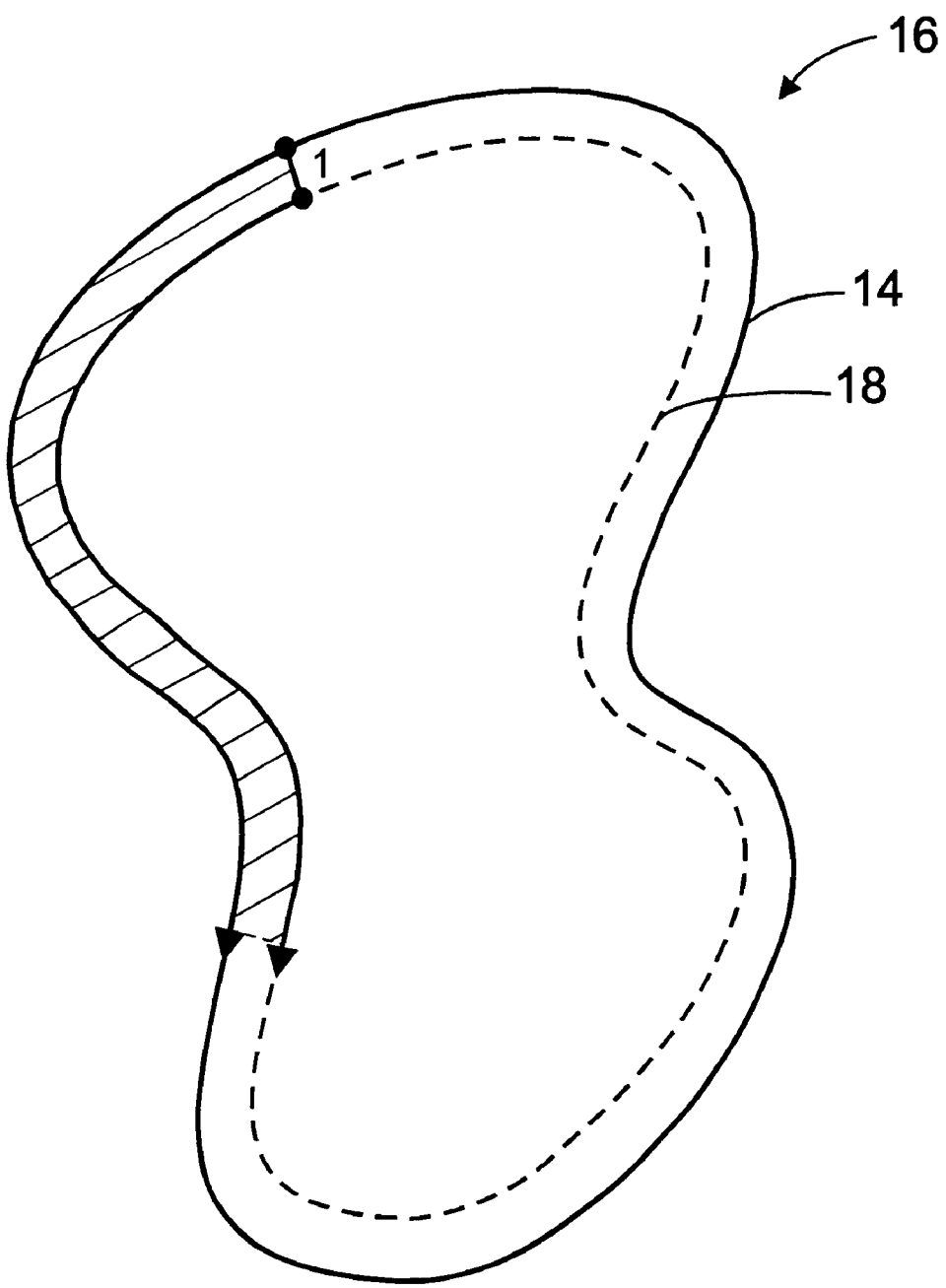
FIG. 4 shows a representative explanatory figure for boundary-based thinning.

As shown in FIG. 4, it is to be appreciated that when following the chain code of the boundary contour 14 in the direction of the arrows, black pixels (not all shown but which may comprise the FIG. 16) on the perimeter of the figure always occur on the left in an exemplary dark-on-light image. This suggests that thinning, to establish a new boundary, or target, 18, can be performed simply by proceeding along the contour 14 and placing a new boundary contour 18 one pixel to the left of the existing boundary contour 14. In order to implement this idea, the quantized boundary contour chain code of a digitized binary image or figure will preferably reflect this convention but provisions must be made for determining when a section of the figure, or image, 16 is sufficiently thin so the new, or target, contour 18 cannot be moved inward further but must instead overlie the existing contour.

The step of displacing the boundary contour one pixel inward is preferably implemented by building a lookup table of path displacement rules or cases, and identifying target path locations for the new boundary path using these predetermined rules. For each case shown in FIGS. 5(a)–5(i), the current path location along the existing, or current, boundary contour is encircled. Also shown, as indices into the table, are the directions into and out of the current path location according to the current boundary chain code. Each entry in the table lists 0, 1, 2, or 3 target locations for the new boundary path.

Note that FIGS. 5(a)–5(i) only show the table entries for incoming directions 0 and 1. Incoming directions 2 through 7 are generalized from these by rotation, as those of skill in the art will appreciate. More particularly, the rules or cases involving incoming tracing directions 2, 4 or 6 are illustrated simply by rotating FIGS. 5(a)–(c) so that the incoming directions 2, 4 and 6 align with the illustrated incoming direction 0. Likewise, the rules or cases involving incoming tracing directions 3, 5, or 7 are illustrated simply by rotating FIGS. 5(d)–(i) so that the incoming directions 3, 5, and 7 align with the illustrated incoming direction 1.

The path displacement rules also specify which black pixel in the bitmap may be colored white as a result of displacing the boundary contour inward one pixel. These are indicated by a circled X.

A condition for the new target path to be displaced one pixel inward from the current path is that the target path remain a boundary between a white (background) pixel and black (figure) pixel. To ensure this condition, each case of FIGS. 5(a)–5(i) also indicates with a question mark nearby pixels that need to be tested (to make sure they are black) in order to displace the path inward. If any of these nearby pixels are not black, the target path location must instead be set to be coincident with the current path location.

As more particularly shown in FIGS. 5(a)–5(i), circled points indicate a current location along the existing contour path. Arrows indicate incoming and outgoing directions relative to the current trace location. As noted above, question marks indicate pixels that must be black in order for the contour to be displaced at this path location. In the description that follows (and throughout the entire description) the direction conventions illustrated in FIG. 3(c) are used for ease of reference.

If the contour is to be displaced (i.e. thinning is to occur at this location), a circled X denotes a subject pixel (which is black for purposes of this description) to be flipped to white, and squares indicate target locations for the new thinned boundary path. If thinning does not occur at this location, the target path location is taken to be the current location indicated by the circled point.

Figure 5A:
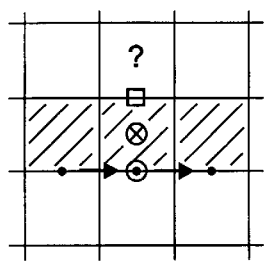
FIGS. 5(a)–5(i) illustrate path displacement rules.

As shown, FIG. 5(a) indicates that when the incoming and outgoing trace directions are 0, the subject pixel is directly above the current location, and the pixels in the directions 0 and 4 relative to the subject pixel are black, the pixel in the direction 2 relative to the subject pixel is tested to determine whether it is black. If the tested pixel is black, then the subject pixel is turned to white and the target path location is established on the opposite side of the subject pixel as shown.

Figure 5B:
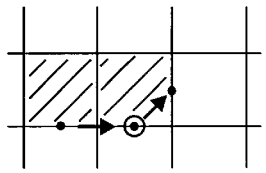

FIG. 5(b) shows an incoming direction 0, an outgoing direction 1, a black pixel directly above the current location of the tracing, and a black pixel in the direction 4 relative to the pixel above the current location. In this case, no alterations of pixels or target path are accomplished.

Figure 5C:
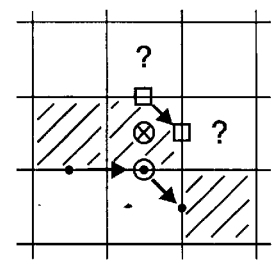

FIG. 5(c) shows an incoming direction 0, an outgoing direction 7, the subject pixel being directly above the current trace location, and black pixels in the directions 4 and 7 relative to the subject pixel. In this case, the pixels in the directions 2 and 0 relative to the subject pixel are tested to determine if such pixels are black. If these pixels are black, the subject pixel is changed to white and the target path altered so that two target path locations border the subject pixel and the tested pixels.

Figure 5D:
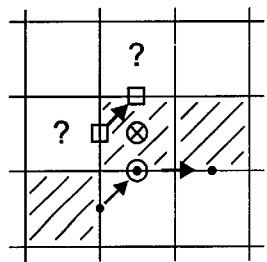

FIG. 5(d) shows an incoming direction 1, an outgoing direction 0, a subject pixel directly above the current trace location, and black pixels in the 5 and 0 directions relative to the subject pixel. In this situation, the pixels in the direction 4 and 2 relative to the subject pixel are tested to determine if such pixels are black. If these pixels are black, the subject pixel is changed to white and two new target path locations are established between the subject pixel and each tested pixel.

Figure 5E:
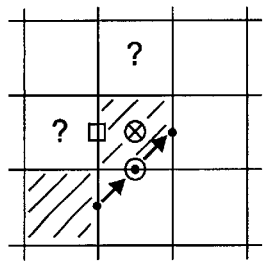

FIG. 5(e) shows incoming and outgoing directions 1, a subject pixel directly above the current trace location, and a neighboring black pixel in the direction 5 relative to the subject pixel. The pixels in the directions 4 and 2 relative to the subject pixel are tested to determine if such pixels are black. If they are black, the subject pixel is changed to white and a new target path location is established on the border between the subject pixel and the pixel in the direction 4 relative to the subject pixel.

Figure 5F:
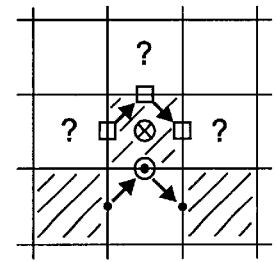

FIG. 5(f) illustrates an incoming direction of 1, an outgoing direction of 7, a subject pixel directly above the current trace location, and black pixels in the directions 5 and 7 relative to the subject pixel. In this case, the pixels in the directions 4, 2, and 0 relative to the subject pixel are tested to determine if such pixels are black. If these pixels are black, the subject pixel is changed to white and three new target path locations are established on the borders of the subject pixel and each tested pixel.

Figure 5G:
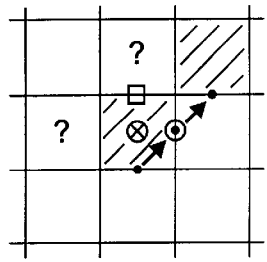

With reference to FIG. 5(g), an incoming direction 1, an outgoing direction 1, a subject pixel to the direct left of the current trace location, and a black pixel in the direction 1 relative to the subject pixel, are illustrated. In this case, pixels in the directions 4 and 2 relative to the subject pixel are tested to determine if they are black. If these pixels are black, the subject pixel is converted to white and a new target path location is established between the subject pixel and the pixel in the direction 2 relative to the subject pixel.

Figure 5H:
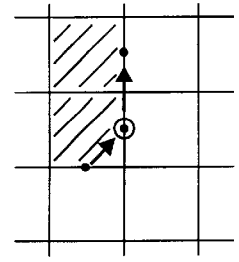

FIG. 5(h) shows a case where the incoming direction is 1, the outgoing direction is 2, the pixel directly to the left of the current trace location is black, and the pixel directly above that pixel is also black. In this case, no pixels are converted and the path is not altered.

Figure 5I:
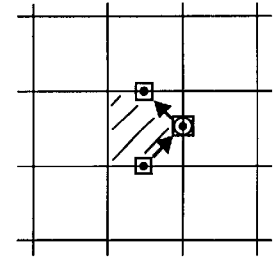

In FIG. 5(i), the incoming direction is 1, the outgoing direction is 3, and a single pixel to the left of the current trace location is black. In this case, no pixels are converted and the target path locations are maintained on all but the left side of the black pixel.

So, as the method traverses along the existing boundary contour, it flips black pixels along the perimeter to white and identifies, or re-encodes, target locations for the new, or target, boundary contour, all according to the path displacement rules. Once one or more new target path locations have been established by the application of a path displacement rule, the method links with previously identified locations on the new path. Because of the complex geometry of non-straight contours and because some of the Path Displacement rules are not able to specify any target path locations with the information available locally, these links may require the placement of as many as four intermediate mid-crack locations on the new boundary contour.

Figure 6A:
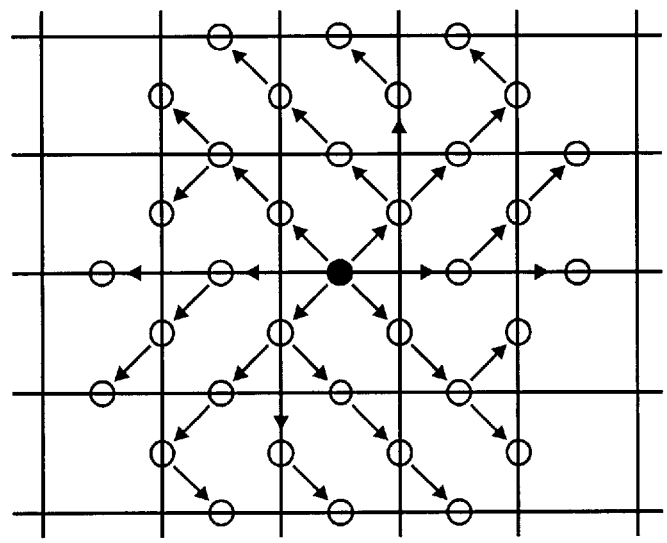
FIGS. 6(a) and 6(b) illustrates path extension rules.
Figure 6B:
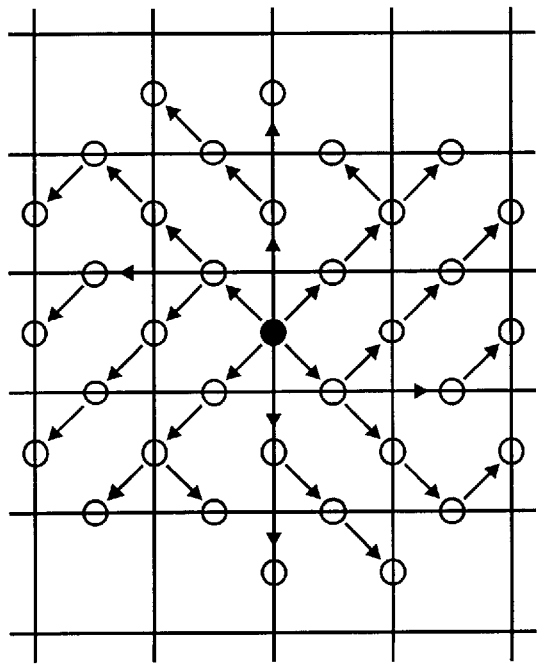

As a result, a set of path extension rules dictate how to extend a new boundary contour. These are shown in FIGS. 6(a)–6(b) where arrows indicate intermediate mid-crack steps to connect the last accepted location in an evolving boundary path (dot) with various possible locations of the next target location (circles). These path extension rules define paths between last known positions on a target curve and new target positions based on the current rule.

A few exceptional situations arise in which the local geometry of a figure demands special rules to ensure proper thinning behavior. These are cataloged in FIGS. 7(a)–7(g). As shown, exceptional conditions occur under certain extended contour paths as indicated by dark arrows, or when certain pixels are black as indicated by question marks. FIG. 7(a) shows a modification to the rule of FIG. 5(g) wherein the pixel with the crossed out question mark (in the direction 4 relative to the subject pixel) need not be black in order for thinning to occur. Note that the path segment prior to the incoming segment is in the direction 0 and the pixel in the direction 1 relative to the subject pixel is not black. FIG. 7(b) shows a modification to the rule of FIG. 5(h) wherein the black subject pixel to the immediate left of the current trace position is flipped to white. Note that the path segment prior to the incoming segment is in the direction 0. FIG. 7(c) shows another modification to the rule of FIG. 5(h) wherein the black subject pixel to the immediate left of the current path location is flipped to white, and a new path target location is placed as shown by the square on the top border of the subject pixel. This modification to rule 5(h) applies only if the proposed target position indicated by the square is ½ pixel distance in both the x and y directions from the last target position, as indicated by the triangle. Also note that the pixels in the directions 4 and 3 relative to the subject pixel are black and the path starting at point P and ending at the current location is defined by the code {6, 7, 0, 1}. FIG. 7(d) shows a modification to the rule of FIG. 5(e) wherein the black subject pixel may be flipped to white, a new path location is placed as shown by the square (between the subject pixel and the tested pixel), and the current location on the existing path is advanced to the location shown by the triangle—to the right of the pixel in the direction 3 relative to the subject pixel. As illustrated, the pixel in the direction 3 relative to the subject pixel is black and only the pixel in the direction 4 relative to the subject pixel needs to be tested. If it is black, the subject pixel is turned to white and the target path attained. FIG. 7(e) shows a modification to the rule of FIG. 5(i) wherein no target positions for the new path are specified at this step. Note that the path segment just prior to the incoming segment is in the direction 7. FIG. 7(f) shows a modification to the rule of FIG. 5(b) wherein if the path is as shown by the arrows (i.e. 5, 5, 6, 7, 0 from P to the current path location) and the pixel indicated by the square (upper right of quadrant) is white, the location on the path indicated by the smaller square—which is also the current path location—should be taken as a target location for the new path and the extension rules applied. FIG. 7(g) shows a modification to the rule of FIG. 5(h), whereby three black pixels are flipped to white and the target location established between the rightmost pixels of the defined quadrant of pixels. The pixel to the immediate left of the current location (the subject pixel) and the pixels in the directions 4 and 3 relative to the subject pixel comprise these three black pixels. The pixel in the direction 2 relative to the subject pixel is initially white and the path from point P to the current location is {5, 6, 7, 0, 1}.

It should be noted that at the beginning of the thinning process, a catalog of starting cases must be consulted in order to bootstrap the thinning process so that the normal path displacement rules and the path extension rules can apply. There is one catalog of starting cases for shrinking black figures on a white background, and another catalog for expanding holes. These are shown in FIGS. 8(a)–8(o) and 9(a)–9(d).

Figure 8G:
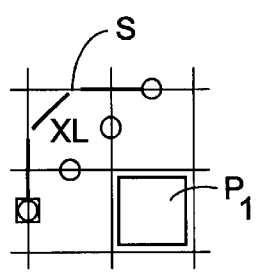
FIGS. 8(a)–8(o) illustrate a catalog of starting configurations for non-whole figures.
Figure 8H:
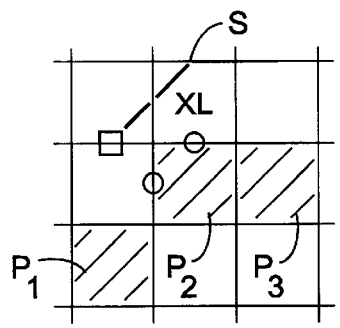
Figure 8I:
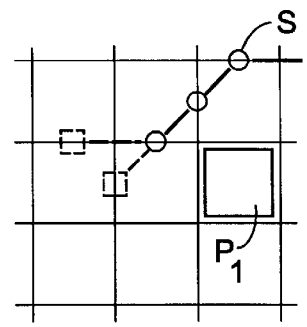
Figure 8J:
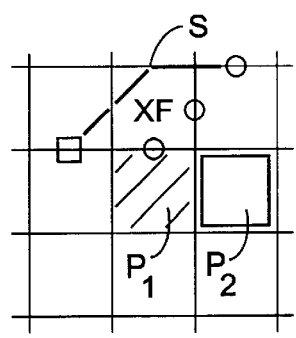
Figure 8K:
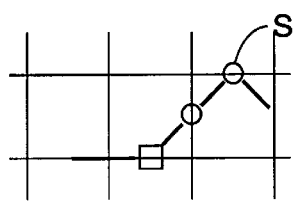
Figure 8L:
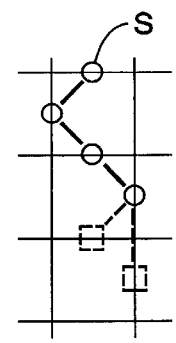
Figure 8M:
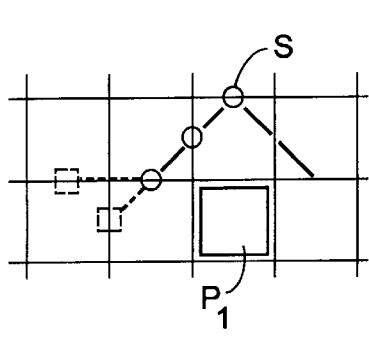
Figure 8N:
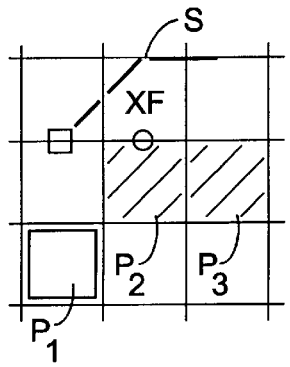
Figure 8O:
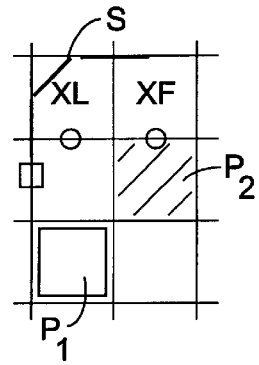

As shown in FIGS. 8(a)–8(o), a catalog of 15 starting configurations for non-hole figures (black figures on white background) is established. In FIGS. 9(a)–9(d), a catalog of 4 configurations for boundary contours representing white holes in black figures is likewise established. In each case, thick black lines indicate the original contour path of the image in the vicinity of the beginning or start location of the boundary contour. Dashed lines indicate a disjunction of possible starting paths for this catalog entry. Hatched pixels and pixels containing an empty square indicate a condition that this pixel must be black or white, respectively, to satisfy this start configuration. Therefore, these pixels must be tested. Circles indicate the initial path of the new boundary contour. Squares indicate initial locations along the old contour from which to begin applying Path Displacement Rules. "XF" indicates that this pixel should be flipped to white immediately. "XL" indicates that this pixel should be flipped to white after the boundary contour has been traversed.

Specifically, FIGS. 8(a)–8(o) illustrate starting configurations for non-hole figures. Accordingly, it should be recognized that only certain pixels (marked as described above) will be tested according to selected configurations to determine if such pixels are black or white. Otherwise, although not so marked, it should be understood that pixels to the left of the boundary contour shown, as the contour is traversed in a counter-clockwise direction, are black and those to the right are white in the original image. It should be further understood that the original boundary contour chain codes noted below begin at the starting location S identified in the drawings.

Referring now to FIG. 8(a), when the original boundary contour has the chain code {5, 6 . . . 3} beginning and ending at the starting location S, the initial path of the new boundary contour, beginning at the same starting location, is {5, 6}. At the terminal point of this new boundary contour, indicated by the square in the figure, the path displacement rules noted above are applied.

Referring to FIG. 8(b), when the original boundary contour has the chain code {5, 5 . . . 3, 3} and the pixel below the pixel having the starting location on its border is determined to be black, the pixel having the starting location on its border is immediately changed to a white pixel and the initial target path location is moved to be between the changed pixel and the tested black pixel. The initial path of the new boundary contour has the code {4} beginning at the new initial target path location. At that terminal location of the new initial path, indicated by the square in the drawing, the path extension rules are applied.

Referring now to FIG. 8(c), when the original boundary contour has the chain code {5, 5, 5 . . . 3}, the initial path for the new boundary contour has the chain code {5, 5} from the same starting location and the path displacement rules are then applied at the location indicated by the square.

Referring now to FIG. 8(d), when the original boundary contour has the chain code {5, 7, 7, 7, (1, 0 or 7) . . . }, the original path is taken as the initial path for the new boundary contour (i.e. {5, 7, 7, 7, (1, 0, or 7)}) and the path displacement rules are applied beginning at the location having the incoming direction specified by the (1, 0, or 7) noted in the chain code above.

FIG. 8(e) shows a figure having the chain code {5, 7, 0, (1, 0 or 7) . . . }. In this case, the initial path of the new boundary contour has the chain code {5, 7, 0, (1, 0 or 7)} with the path displacement rules being initiated at the end of the path identified by this chain code.

FIG. 8(f) shows a starting configuration having the original contour with the chain code {5, 6 . . . 4}. As shown, if pixels $P_1$ and $P_2$ are black, the pixel above pixel $P_1$ is changed to white and the initial path of the new boundary contour is established to have locations on the top and left side borders of $P_1$. After the thinning pass is completed, the pixel in the direction 3 relative to pixel $P_1$ is also changed to black. In this configuration, the path displacement rules are initiated on the left border of the pixel above $P_2$.

FIG. 8(g) shows an original boundary contour having the chain code {5, 6 . . . 4} and a white pixel $P_1$ in the lower right portion of the illustrated quadrant. Under these conditions, the initial path of the new boundary contour starts one pixel length in the direction 0 from the original starting position S and has the code {5, 5, 5}. The location where this chain code terminates is thus where the path displacement rules are initiated. After the boundary is traversed, the pixel in the direction 3 relative to $P_1$ is changed to white.

Referring now to FIG. 8(h), an original boundary contour having the code {5, 5 . . . 4} and black pixels $P_1$, $P_2$ and $P_3$, are shown. Under these circumstances, the initial path of the new boundary contour starts one pixel length directly below the original starting location and has the code {5, 3}. The path displacement rules are then initiated at the location indicated by the square. After the boundary is traversed, the pixel in the direction 2 relative to $P_2$ is changed to white.

FIG. 8(i) shows an original boundary contour having the chain code {5, 5, (4 or 5) . . . 4} and a white pixel $P_1$ directly below the pixel having the starting location on its top border. In this configuration, the initial path for the new boundary contour has the code {5, 5, (4 or 5)}. Path displacement rules are thus initiated at the terminal point of that path, as shown by the alternate squares.

FIG. 8(j) illustrates an original boundary contour having the code {5, 5 . . . 4}, a black pixel $P_1$ and a white pixel $P_2$. In this environment, the pixel above $P_1$ is changed to white and the initial path of the new boundary is begun one pixel length in the direction 0 relative to the original starting location using the code {5, 5, 4}. The path displacement rules are then initiated.

FIG. 8(k) shows an initial boundary contour having the code {5, 5 . . . 3}. In this situation, the initial path of the new boundary contour is the same as the initial path of the original boundary contour. That is, the new path has the code {5, 5}. The path displacement rules are then initiated.

FIG. 8(l) shows an original boundary contour having the code {5, 7, 7, (5 or 6) . . . }. In this situation, the initial path for the new boundary contour before the path displacement rules are applied is {5, 7, 7, (5 or 6)}.

FIG. 8(m) includes an illustration of a boundary contour having an original code of {5, 5, (4 or 5) . . . 3, 3} and a white pixel $P_1$ located one pixel length below the starting location S. In this case, the initial boundary path for the new boundary is {5, 5, (4 or 5)}.

FIG. 8(n) illustrates an original boundary contour having the code {5, 5 . . . 4}, white pixel $P_1$ and black pixels $P_2$ and $P_3$. In this case, the initial boundary path is selected to begin one pixel length below the original starting location and has the chain code of {4} before the path displacement rules are applied. It should be further noted that in this configuration, the pixel directly below the starting location is immediately turned to black.

Referring now to FIG. 8(o), an original boundary contour having the code {5, 6 . . . 4}, white pixel $P_1$ and black pixel $P_2$ are shown. In this configuration, the starting location for the initial path for the new boundary contour is placed on the upper boundary of pixel $P_2$. The initial path thus has the code {4, 5}. The path displacement rules are initiated at the terminal point of that code. It should also be noted that the pixel marked XF is immediately changed to a white pixel while the pixel marked XL is changed to a white pixel after the boundary contour has been traversed.

As noted above, FIGS. 9(a) through 9(d) illustrate starting configurations for boundary contours representing white holes in black figures. As such, although notations are generally similar to FIGS. 8(a)–8(o), it should be recognized that pixels to the left of the boundary contour, as the boundary contour is traversed in the clockwise direction, are black while pixels to the right are white.

Figure 9A:
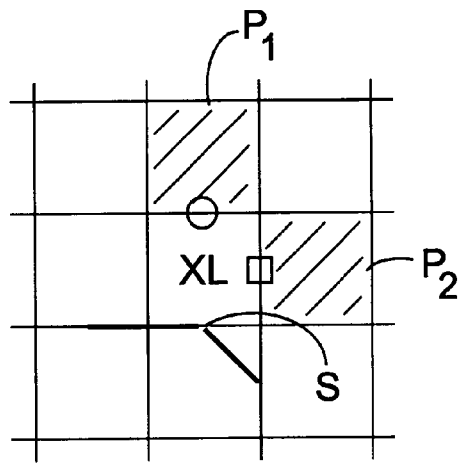
FIGS. 9(a)–9(d) illustrate a catalog of configurations for boundary contours representing white holes and black figures.

Referring now to FIG. 9(a), the boundary chain code for the original boundary contour is {7 . . . 0}. In this configuration, pixels $P_1$ and $P_2$ are black. If these conditions are met, the starting point of the initial path for the new boundary contour is moved one pixel length directly above the original starting location (on the lower border of pixel $P_1$) and the initial direction of the path is in the direction 7. The path displacement rules are then initiated. It should also be noted that the pixel between the black pixel $P_1$ and the original starting location is changed to a black pixel after the boundary contour has been traversed.

Figure 9B:
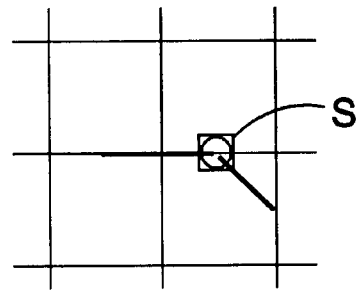

Referring to FIG. 9(b), an original boundary contour having the code {7 . . . 0} is shown. In this case, the same boundary contour is maintained and the path displacement rules are applied at the original starting point.

Figure 9C:
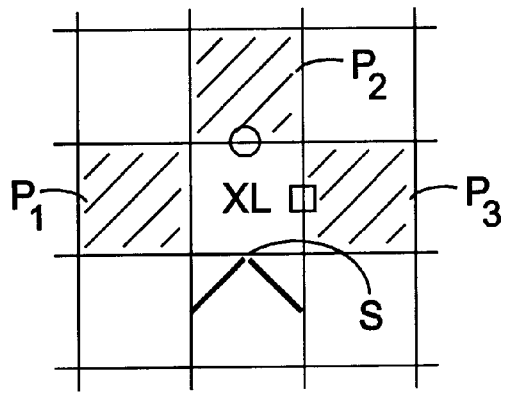

Referring to FIG. 9(c), the original contour has the code {7 . . . 1} and pixels $P_1$, $P_2$ and $P_3$ are black. In this configuration, the starting location for the initial path for the new boundary contour is established on the lower border of pixel $P_2$ and, before the path displacement rules are applied, tracing is advanced in the direction 7 relative to the new starting point. It should also be noted that the pixel designated XL, between the original and new starting locations, is changed to a white pixel after the boundary contour has been traversed.

Figure 9D:
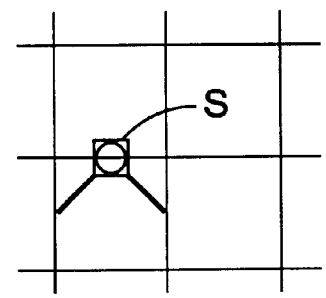

With respect to FIG. 9(d), an original boundary contour having the code {7 . . . 1} is shown. In this case, the path displacement rules are applied at the original starting position.

At the conclusion of a thinning pass around a contour, the process terminates when the last position in the current chain code curve is reached. The following are modifications (shown in FIGS. 10(a)–(b) ) to the normal stopping condition which involve interposing one additional intermediate target position for the new curve. In the figures, arrows indicate direction of last path link in the original chain code curve. A circle indicates the first point on the path in new chain code curve. A triangle indicates a last target position on new chain code curve. It should be recognized that multiple triangles on the diagrams indicate alternative last target positions. A square indicates an intermediate target position on new chain code curve to which a path extension rule is applied.

Figure 10A:
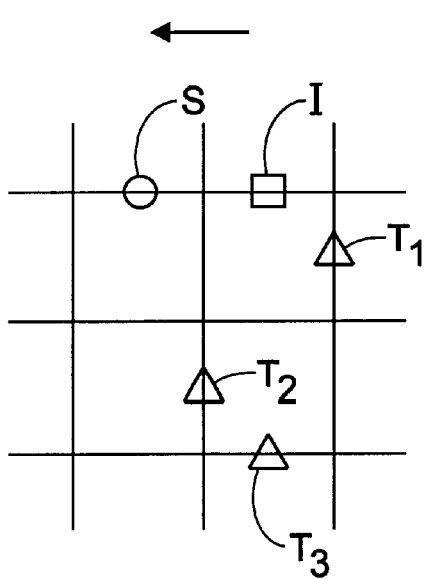
FIGS. 10(a)–10(b) illustrate stopping cases.
Figure 10B:
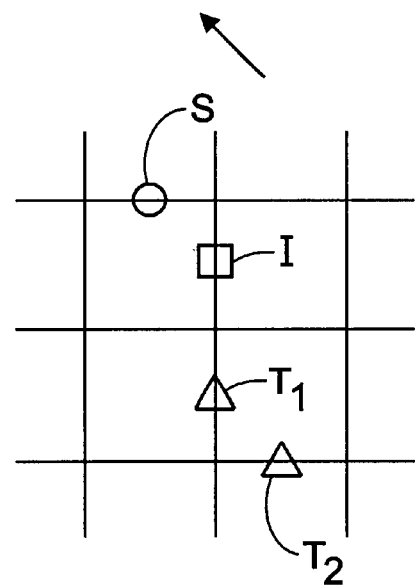

Referring to FIG. 10(a), if the first point on the new chain code curve is at position S, and the last target position is located at either position $T_1$, $T_2$, or $T_3$, an intermediate target position 1 is established. Likewise, referring now to FIG. 10(b), if the starting position of the new chain code is as shown at S, and the last target position is $T_1$ or $T_2$, then the intermediate target position 1 is established. These special stopping cases are necessary to avoid undesired new boundary paths.

If the mid-crack encoded contour is 8 pixels in length or shorter, a simple lookup table is consulted to determine the boundary path and remaining black pixels of the final figure. This is shown in FIGS. 11(a)–11(i) where a catalog of 9 configurations of boundary contours equal to 8 pixels in length. The circled X indicates a pixel to delete, or change to white. Figures shorter than 8 pixels are already considered thinned.

Referring to the figures, the boundary contours shown are illustratively designated to be contours for non-holes for ease of description. Of course, it is to be appreciated that this aspect of the invention could be applied to non-holes as well. In addition, the chain codes listed were determined by traversing the boundary beginning at the starting location S.

As shown, the chain code for the contour of FIG. 11(a), beginning at the starting point S, is {5, 6, 7, 0, 1, 2, 3, 4}. In this configuration, all but the upper left pixel of the quadrant of pixels are changed from black to white, or deleted.

FIG. 11(b) has a chain code of {5, 6, 7, 1, 1, 1, 3, 4}. In this case, the upper left pixel of the four pixels that are traversed by the boundary is deleted.

In FIG. 11(c), the boundary is represented by the chain code {5, 5, 5, 7, 1, 1, 1, 3}. No pixels are deleted in this configuration.

As shown at FIG. 11(d), the chain code is {5, 7, 7, 7, 1, 3, 3, 3}. Again, no pixels are deleted in this configuration.

FIG. 11(e) illustrates a chain code of {5, 5, 5, 7, 0, 1, 2, 3}. Only the bottom right pixel of the four traversed pixels is changed to black.

FIG. 11(f) shows a contour with the chain code {5, 7, 7, 7, 1, 2, 3, 4}. In this case, the upper right pixel of the quadrant of pixels traversed is changed to white.

FIG. 11(g) illustrates the chain code {5, 6, 7, 0, 1, 3, 3, 3}. In this case, the bottom left pixel of the quadrant traversed is changed to white.

FIG. 11(h) shows a contour with a chain code of {5, 6, 6, 7, 1, 2, 2, 3}. No pixels are converted in this configuration.

FIG. 11(i) illustrates a contour having a chain code of {5, 7, 0, 0, 1, 3, 4, 4}. Again, no pixels are converted if this configuration is encountered.

Figure 12:
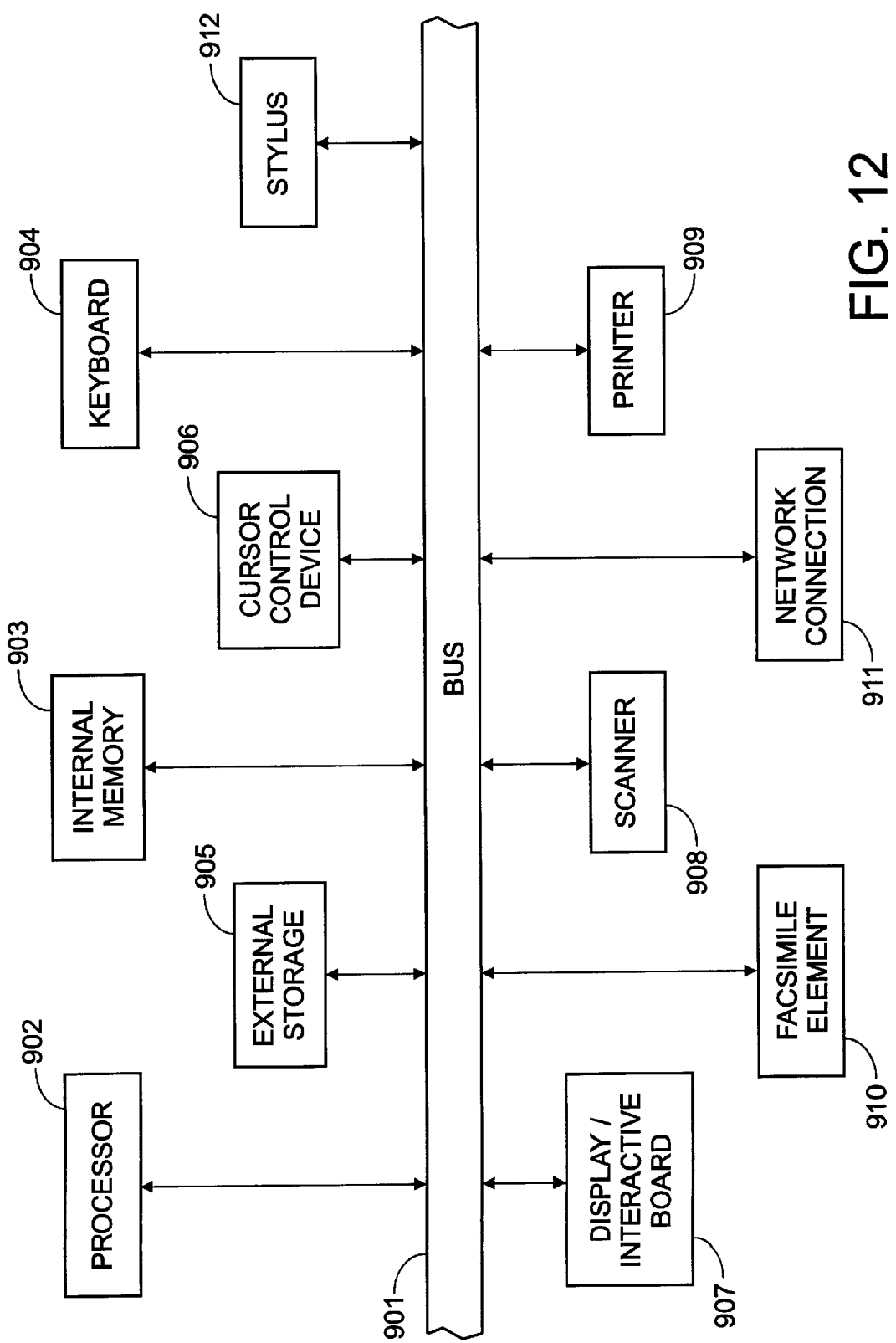
FIG. 12 shows a system upon which the method of the present invention is implemented.

An exemplary computer based system on which the currently preferred embodiment of the present invention may be used is described with reference to FIG. 12. As shown, the computer based system is comprised of a plurality of components coupled via bus 901. The bus 901 illustrated here is simplified in order not to obscure the present invention. The bus 901 may consist of a plurality of parallel buses (e.g. address, data and status buses) as well as a hierarchy of buses (e.g. a processor bus, a local bus and an I/O bus). In any event, the computer system is further comprised of a processor 902 for executing instructions provided via bus 901 from Internal memory 903 (note that the Internal memory 903 is typically a combination of Random Access or Read Only Memories). Such instructions are those that are preferably implemented in software for carrying out the processing steps outlined above in connection with Also coupled to the bus 901 are a keyboard 904 for entering alphanumeric input, external storage 905 for storing data such as a compressed text image data file, a cursor control device 906 for manipulating a cursor, a stylus 912, and a display 907 for displaying visual output. The display 907 in the context of the present invention may also include an electronic interactive display board. The keyboard 904 would typically be a standard QWERTY keyboard but may also be a telephone-like keypad. The external storage 905 may be fixed or removable magnetic or optical disk drive. The cursor control device 906 will typically have a button or switch associated with it to which the performance of certain functions can be programmed. Further coupled to the bus 901 is a scanner 908. The scanner 908 provides a means for creating a bit mapped representation of a medium (i.e. a scanned document image).

Optional elements that could be coupled to the bus 901 would include printer 909, facsimile element 910 and network connection 911. The printer 909 could be used to print the bitmapping representation. The facsimile element 910 may contain an element used to transmit a image data that has been compressed using the present invention. Alternatively, the facsimile element 910 could include an element for decompression of a document image compressed using the present invention. The network connection 911 would be used to receive and/or transmit data containing image data. Thus, the image data utilized by the present invention may be obtained through a scanning process, via a received fax or over a network.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of the invention.

Having thus described the invention, I hereby claim:

1. A method for thinning a binary figure having a contour within an image having white and black pixels with boundaries therebetween and midpoints on such boundaries for each pixel, the method comprising:

scanning the image to locate a starting point on the figure, the starting point being defined as a mid point on a horizontal boundary above a first boundary between black and white pixels encountered during the scanning;

encoding the figure by successively tracing from midpoint to midpoint along the contour of the figure to generate a mid-crack chain code for the figure, the tracing commencing at the starting point and proceeding in selected directions having predetermined codes;

storing the generated chain code; and, selectively converting black pixels to white pixels along the contour of the figure to generate a target contour based on the chain code and a predetermined set of rules wherein the rules require an examination of fewer than 8 pixels surrounding a black pixel being considered for conversion and are based on a condition that the target contour be a boundary between a white pixel and a black pixel.

2. The method as set forth in claim 1 wherein the scanning comprises raster scanning.

3. The method as set forth in claim 1 wherein the storing comprises storing the generated chain code in a buffer.

4. The method as set forth in claim 1 wherein the predetermined set of rules are stored in at least one look-up table.

5. The method of claim 1 wherein the step of selectively converting comprises:

returning to the starting point;

following the stored chain code to successive mid-points associated with subject pixels along the contour;

testing fewer than 8 pixels surrounding a subject pixel, the testing being based on chain codes associated with the subject pixel, and converting or not converting black pixels to white pixels based on the testing, thereby thinning the figure.

6. The method of claim 5 further comprising:

generating a new chain code based on a contour of the thinned figure, and storing the new chain code.

7. The method of claim 6 further comprising:

moving to a starting point of the new chain code;

following the new chain code to successive mid-points associated with subject pixels along the thinned contour;

testing fewer than 8 pixels surrounding a subject pixel, the testing being based on chain codes associated with the subject pixel, and converting black pixels to white pixels, as determined by the testing, thereby thinning the figure.

8. A method for thinning a binary figure having a contour within an image having white and black pixels with boundaries therebetween and midpoints on such boundaries for each pixel, the method comprising:

encoding the figure;

storing a generated chain code;

selectively converting black pixels to white pixels along the contour of the figure to generate a target contour based on the chain code and a predetermined set of rules stored in a lookup table wherein the rules require an examination of fewer than 8 pixels surrounding a black pixel being considered for conversion and are based on a condition that the target contour be a boundary between a white pixel and a black pixel.

9. The method as set forth in claim 8 further comprising scanning the image to locate a starting point on the figure.

10. The method as set forth in claim 9 wherein the scanning comprises raster-scanning.

11. The method as set forth in claim 9 wherein the starting point is defined as a midpoint on a horizontal boundary above a first boundary between black and white pixels encountered during the scanning.

12. The method as set forth in claim 8 wherein the encoding comprises successively tracing from midpoint to midpoint along the contour of the figure.

13. The method as set forth in claim 12 wherein the tracing commencing at the starting point and proceeding in selected directions having predetermined codes.

14. The method as set forth in claim 8 wherein the storing comprises storing the generated chain code in a buffer.

15. The method as set forth in claim 8 wherein the predetermined set of rules are stored in at least one look-up table.

16. The method of claim 8 wherein the step of selectively converting comprises:

returning to the starting point;

following the stored chain code to successive mid-points associated with subject pixels along the contour;

accessing testing rules for a subject pixel by using chain codes associated with the subject pixel as indices into a testing rule look up table;

testing fewer than 8 pixels surrounding a subject pixel as indicated by the accessed testing rules, and converting black pixels to white pixels, as determined by the application of the testing rules during the testing, thereby thinning the figure.

17. The method of claim 16 further comprising:

generating a new chain code based on a contour of the thinned figure, and storing the new chain code.

18. The method of claim 17 further comprising:

moving to a starting point of the new chain code;

following the new chain code to successive mid-points associated with subject pixels along the contour;

accessing testing rules for a subject pixel by using new chain codes associated with the subject pixel as indices into a testing rule look up table;

testing fewer than 8 pixels surrounding a subject pixel as indicated by the accessed testing rules, and converting black pixels to white pixels, as determined by the application of the testing rules during the testing, thereby thinning the figure.

19. A method for thinning binary figures having contours within an image, the image having white and black pixels with boundaries therebetween and midpoints on such boundaries for each pixel, the method comprising:

a) inputting the image;

b) scanning the image to locate a starting point on a first figure;

c) encoding the first figure by successively tracing from midpoint to midpoint along the contour of the first figure to generate a first mid-crack chain code for the first figure, the tracing commencing at the starting point and proceeding in selected directions having predetermined codes;

d) storing the generated first chain code in a buffer;

e) successively repeating the scanning, encoding and storing steps for remaining figures in the image to generate and store respective chain codes therefor;

f) selecting the first chain code from the buffer;

g) selectively converting black pixels to white pixels along the contour of the first figure to generate a target contour based on the first chain code and a predetermined set of rules stored wherein the rules require an examination of fewer than 8 pixels surrounding a black pixel being considered for conversion and are based on a condition that the target contour be a boundary between a white pixel and a black pixel;

h) determining whether any pixels were converted in the converting step;

i) storing a modified first chain code in the buffer if pixels were converted;

j) determining whether other codes are stored in the buffer; and, k) successively repeating the selective converting, determining, and storing steps for the respective chain codes for the remaining figures in the image if other codes are stored.

20. The method as set forth in claim 19 wherein the starting point is defined as a mid point on a horizontal boundary above a first boundary between black and white pixels encountered during the scanning.

21. The method as set forth in claim 19 wherein the scanning comprises raster scanning.

22. The method as set forth in claim 19 wherein the storing comprises storing the generated chain codes in a first-in, first-out buffer.

23. The method as set forth in claim 19 wherein the predetermined set of rules are stored in a look-up table.

24. The method of claim 13 wherein the step of selectively converting comprises:
    moving to a first mid-crack point associated with the first chain code;
    following the first chain code to successive mid-points associated with subject pixels along the contour of the first figure;
    testing fewer than 8 pixels surrounding a subject black pixel, the testing being based on predetermined rules associated with chain codes associated with the subject pixel, and
    converting the subject black pixels to white pixels, as determined by applying the predetermined rules during the testing, thereby thinning the figure.

25. A system operative to thin a binary figure having a contour within an image having background and figure pixels with boundaries therebetween and midpoints on such boundaries for each pixel, the system comprising:
    means for scanning the image to locate a starting point on the figure, the starting point being defined as a mid point on a horizontal boundary above a first boundary between figure and background pixels encountered during the scanning;
    means for encoding the figure to successively trace from midpoint to midpoint along the contour of the figure to generate a mid-crack chain code for the figure, the tracing commencing at the starting point and proceeding in selected directions having predetermined codes;
    means for storing the generated chain code; and,
    means for selectively converting figure pixels to background pixels along the contour of the figure to generate a target contour based on the chain code and a predetermined set of rules wherein the rules require an examination of fewer than 8 pixels surrounding a figure pixel being considered for conversion and are based on a condition that the target contour be a boundary between a background pixel and a figure pixel.

26. The system as set forth in claim 25 wherein the means for scanning comprises a means for raster scanning.

27. The system as set forth in claim 25 wherein the means for storing comprises a buffer.

28. The system as set forth in claim 25 further comprising at least one look-up table operative to store a representation of the predetermined set of rules.

29. An system operative to extract skeletons of binary figures within image data, the system comprising:
    a processor operative to execute program instructions; and,
    an internal memory comprising at least one of random access memory and read only memory, the internal memory operative to store the program instructions and thinning rules requiring the testing of fewer than 8 pixels neighboring a subject pixel, the program instructions being operative to instruct the processor in finding figures within the image data, creating chain codes representative of boundary paths taken during traversals of the figures, and thinning the figures based on the chain codes and the thinning rules.

30. The system of claim 29 wherein the thinning rules are stored in a look-up table that is indexed by chain code information related to subject pixels.

31. The system of claim 29 wherein the program instructions are also operative to instruct the processor to generate updated chain codes as each figure is thinned, the updated chain code being representative of boundary paths created during the thinning of the figures.

32. The system of claim 29 further comprising a scanner operative to scan a document and deliver the image data to the processor for storage in the internal memory.

33. The system of claim 29 further comprising a printer.

34. A method for thinning a binary figure having a contour within an image having background and figure pixels with boundaries therebetween and midpoints on such boundaries for each pixel, the method comprising:
    scanning the image to locate a starting point on the figure, the starting point being defined as a mid point on a horizontal boundary above a first boundary between figure and background pixels encountered during the scanning;
    encoding the figure by successively tracing from midpoint to midpoint along the contour of the figure to generate a mid-crack chain code for the figure, the tracing commencing at the starting point and proceeding in selected directions having predetermined codes;
    storing the generated chain code; and,
    selectively converting figure pixels to background pixels along the contour of the figure to generate a target contour based on the chain code and a predetermined set of rules wherein the rules require an examination of fewer than 8 pixels surrounding a figure pixel being considered for conversion and are based on a condition that the target contour be a boundary between a background pixel and a figure pixel.

35. A method for thinning binary figures having contours within an image, the image having background and figure pixels with boundaries therebetween and midpoints on such boundaries for each pixel, the method comprising:
    a) inputting the image;
    b) scanning the image to locate a starting point on a first figure;
    c) encoding the first figure by successively tracing from midpoint to midpoint along the contour of the first figure to generate a first mid-crack chain code for the first figure, the tracing commencing at the starting point and proceeding in selected directions having predetermined codes;
    d) storing the generated first chain code in a buffer;
    e) successively repeating the scanning, encoding and storing steps for remaining figures in the image to generate and store respective chain codes therefor;
    f) selecting the first chain code from the buffer;
    g) selectively converting figure pixels to background pixels along the contour of the first figure to generate a target contour based on the first chain code and a predetermined set of rules stored wherein the rules require an examination of fewer than 8 pixels surrounding a figure pixel being considered for conversion and are based on a condition that the target contour be a boundary between a background pixel and a figure pixel;
    h) determining whether any pixels were converted in the converting step;
    i) storing a modified first chain code in the buffer if pixels were converted;
    j) determining whether other codes are stored in the buffer; and,
    k) successively repeating the selective converting, determining, and storing steps for the respective chain codes for the remaining figures in the image if other codes are stored.

* * * * *